(12) United States Patent
Tanaka

(10) Patent No.: US 7,002,647 B2
(45) Date of Patent: Feb. 21, 2006

(54) DISPLAY DEVICE AND METHOD OF MANUFACTURING THE SAME

(75) Inventor: Tsutomu Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 255 days.

(21) Appl. No.: 10/240,473

(22) PCT Filed: Feb. 5, 2002

(86) PCT No.: PCT/JP02/00935

§ 371 (c)(1),
(2), (4) Date: Feb. 10, 2003

(87) PCT Pub. No.: WO02/063388

PCT Pub. Date: Aug. 15, 2002

(65) Prior Publication Data

US 2004/0027503 A1   Feb. 12, 2004

(30) Foreign Application Priority Data

Feb. 5, 2001   (JP)   ............................... 2001-27966

(51) Int. Cl.
*G02F 1/1335* (2006.01)
*H01L 23/58* (2006.01)
*H01L 21/00* (2006.01)

(52) U.S. Cl. .................... 349/107; 257/89; 257/98; 438/29

(58) Field of Classification Search ............ 438/26–28, 438/29, 30, 32, 34, 35; 257/88, 89, 98; 349/56, 349/84, 85, 104, 106, 107, 158, 160, 187
See application file for complete search history.

(56) References Cited

U.S. PATENT DOCUMENTS 5,521,731 A * 5/1996 Fukuyama et al. ........... 349/51
5,946,065 A   8/1999 Tagusa et al.

FOREIGN PATENT DOCUMENTS

| JP | 63155614 | 6/1988 |
| JP | 6138490 | 5/1994 |
| JP | 7175050 | 7/1995 |
| JP | 09-090426 | 4/1997 |
| JP | 990426 | 4/1997 |
| JP | 1152415 | 2/1999 |
| JP | 11-153804 | 6/1999 |

(Continued)

*Primary Examiner*—Evan Pert
(74) *Attorney, Agent, or Firm*—Sonnenschein, Nath & Rosenthal LLP

(57) ABSTRACT

An active matrix type display device is realized by integrally forming pixel electrodes and switching thin film transistors. The display device has a panel structure formed by a pair of substrates bonded to each other with a predetermined gap separating them and a liquid crystal layer held in the gap between the pair of substrates. A set of thin film transistors, a planarizing film covering said thin film transistors and a set of pixel electrodes arranged on the planarizing film are formed on one of the substrates, whereas an opposite electrode is formed vis-a-vis the set of pixel electrodes on the other substrate. The planarizing film of the display device is made of a photosensitive material and formed to have a varying thickness in the first substrate by means of an exposure process. The parts of the planarizing film that correspond to the pixel electrodes have a thickness that is made to vary according to the wavelength of the display colour assigned to each of the pixel electrodes.

11 Claims, 9 Drawing Sheets

FOREIGN PATENT DOCUMENTS

| | | |
|---|---|---|
| JP | 11153804 | 6/1999 |
| JP | 9127553 | 8/1999 |
| JP | 2000-147543 | 5/2000 |
| JP | 2000147543 | 5/2000 |
| JP | 2000-330104 | 11/2000 |
| JP | 2000330104 | 11/2000 |

* cited by examiner

DISPLAY DEVICE AND METHOD OF MANUFACTURING THE SAME

TECHNICAL FIELD

This invention relates to a display device and a method of manufacturing the same. More particularly, the present invention relates to an improvement to the planarizing technique that is being used for burying undulations produced by thin film transistors and their wires in the process of manufacturing an active matrix type display device, which comprises as integral parts thereof pixel electrodes and switching thin film transistors, so as to form pixel electrodes on the planarized surface.

BACKGROUND OF THE INVENTION

Conventional display devices typically have a so-called panel structure produced by arranging a pair of substrates with a predetermined gap separating them and bonding them to each other with an electro optic substance such as liquid crystal held in the gap. A set of thin film transistors are formed on one of the substrates and covered by a planarizing film, on which a set of pixel electrodes are arranged, whereas an opposite electrode is arranged on the other substrate vis-a-vis the set of pixel electrodes.

In the case of a colour display device, colour filters are arranged on the so-called other substrate so as to assign the three primary display colours of red, blue and green to each of the pixel electrodes. Each pixel electrode transmits or reflects light of the wavelength of the colour assigned to it in order to cause the display device to display a desired colour image. The thickness of the layer of the electrooptic substance, which may typically be liquid crystal, of the colour display device needs to be regulated according to the wavelength of the colour assigned to each pixel so as to optimize the transmission factor or the reflection factor. However, conventional colour display devices are not provided with such a regulating function and hence it is difficult to optimally balance the three primary colours of red, blue and green on the display screen.

Active matric type display devices of the built-in drive circuit type are known. The display device of this type comprises high performance polysilicon thin film transistors to make it possible to integrally form a pixel array section and a peripheral drive circuit section on a same substrate. The pixel array section is formed by using pixel electrodes and thin film transistors for driving the pixel electrodes. The drive circuit section is also formed by using thin film transistors that are adapted to drive the pixel array section. The pixel array section and the drive circuit section formed on a same substrate are covered by a common planarizing film. Since the pixel array section and the drive circuit section are different from each other in terms of the microstructure on the surface of the substrate, it is not always possible to uniformly planarize the two sections so that the thickness of the electrooptic substance, which may typically be liquid crystal, may locally have fluctuations to consequently degrade the quality of the displayed image.

Additionally, in the case of reflection type display devices, micro-undulations are formed on the surface of the planarizing film and light-reflecting pixel electrodes are formed thereon so that the pixel electrodes may be made to provide a desired light scattering effect. However, a special processing step needs to be introduced for forming micro-undulations on the planarizing film to complicate the manufacturing process.

SUMMARY OF THE INVENTION

In view of the above identified circumstances, it is therefore the object of the present invention to provide a novel display device and a method of manufacturing the same that can dissolve the technological problems of conventional display devices.

In an aspect of the invention, the above object is achieved by providing a display device having a panel structure formed by a pair of substrates bonded to each other with a predetermined gap separating them and an electrooptic substance held in the gap between the pair of substrates, a set of thin film transistors, a planarizing film covering said thin film transistors and a set of pixel electrodes arranged on the planarizing film being formed on one of the substrates, which may be referred to as the first substrate, an opposite electrode being formed vis-a-vis the set of pixel electrodes on the other substrate, which may be referred to as the second substrate. The planarizing film of the display device is made of a photosensitive material and formed to have a varying thickness in the first substrate by means of an exposure process.

In a display device according to the invention, preferably the first substrate has thereon a pixel array section formed by the pixel electrodes and thin film transistors for driving the pixel electrodes and a drive circuit section formed by thin film transistors for driving the pixel array section and the planarizing film is formed so as to extend from the pixel array section to the peripheral drive circuit section and have a thickness differentiated between the pixel array section and the drive circuit section.

In a display device according to the invention, preferably the planarizing film has a region where the thickness thereof is made to vary so as to produce undulations on the surface and the pixel electrodes are made of reflective film and arranged in the region having undulations. In a display device according to the invention, preferably, different display colours are assigned to the pixel electrodes and the planarizing film is formed to have a thickness that varies according to the wavelength of the display colour assigned to each of the pixel electrodes.

In another aspect of the present invention, there is provided a method of manufacturing a display device having a panel structure formed by a pair of substrates bonded to each other with a predetermined gap separating them and an electrooptic substance held in the gap between the pair of substrates, the method including a step of forming a set of thin film transistors, a planarizing film covering said thin film transistors and a set of pixel electrodes arranged on the planarizing film on one of the substrates, which may be referred to as the first substrate, and forming an opposite electrode vis-a-vis the set of pixel electrodes on the other substrate, which may be referred to as the second substrate, the step of forming said planarizing film including an application step of applying a photosensitive material onto the first substrate, an exposure step of subjecting the planarizing film to an exposure process using a varied planar distribution of quantity of exposure light and a processing step of processing the planarizing film so as to make it have a thickness varied according to the planar distribution of quantity of exposure light by etching the surface of the exposed planarizing film. In a method of manufacturing a display device according to the invention, preferably light is irradiated onto the planarizing film by way of a mask having a varied planar distribution of transmission factor in the exposure step. The planarizing film is exposed to light for a plurality of times in the exposure step, using a plurality of masks, in order to irradiate light to the planarizing film with a predetermined quantity of energy. Alternatively, a single mask provided with a filter having predetermined parts adapted to irradiate light to the planarizing film with different respective quantities of energy may be used. A pattern adapted to diffract light may be used for the filters in the exposure step. Alternatively, a filter made of two or more than two light shielding substances having different light transmission factors may be used. Preferably, a mask provided with a filter having a light transmission factor between 1% and 50% is used in the exposure step.

Thus, in a display device according to the invention realized by using an electro optic substance such as liquid crystal, the planarizing film applied to the surface of a substrate integrally carrying active elements such as thin film transistors is so devised that its thickness is made to vary within the substrate. With this arrangement, it is now possible to provide each of the red, blue and green pixels of the colour display device with an optimal thickness. Therefore, it is possible to improve the uneven gap in both of the pixel array section and the drive circuit section of the panel of a built-in drive circuit type display device realized by integrally forming pixel arrays and drive circuits. Additionally, in the case of a reflection type display device, it is now possible to make the pixel electrodes operating as reflective film provide a desired light scattering effect with a reduced number of steps, by varying the thickness of the planarizing film so as to produce undulations on the surface thereof.

The other objects and the advantages of the present invention will be made clear in the following description of the preferred embodiments of the invention.

DETAILED DESCRIPTION OF THE PRESENTLY PREFERRED EMBODIMENTS

Now, the present invention will be described in greater detail by referring to the accompanying drawings that illustrate preferred embodiments of the invention.

Figure 1:
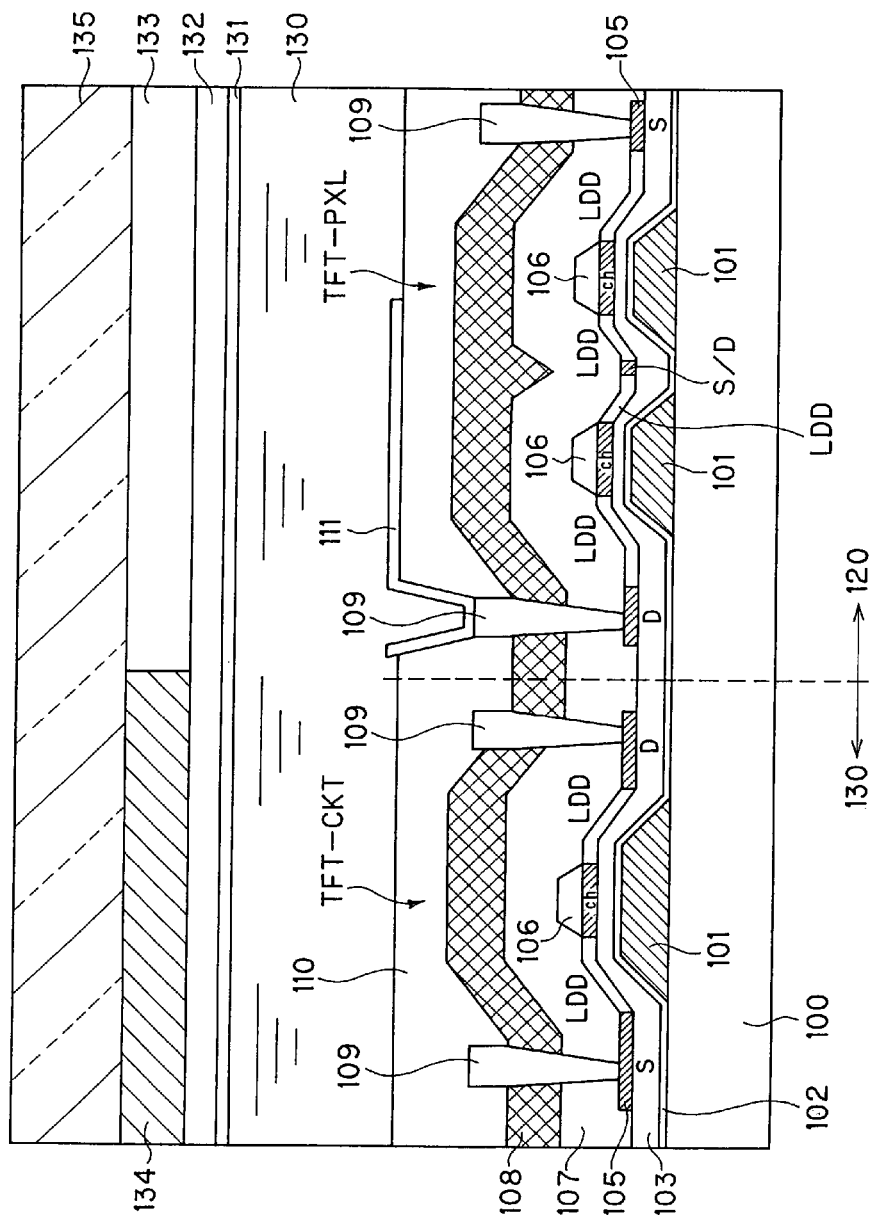
FIG. 1 is a schematic cross sectional view of a part of a display device according to the invention, illustrating its basic configuration.

Firstly, the general configuration of colour display devices will be briefly described by referring to FIG. 1 in order to clarify the background of the invention. The display device of FIG. 1 has a so-called panel structure produced by arranging a pair of glass substrates 100, 135 with an electrooptic substance 130 held between the substrates. In FIG. 1, an opposite electrode 131, a planarizing layer 132, a colour filter 133 and a black matrix 134 are formed on the upper glass substrate 135.

On the other hand, a pixel array section 120 and a drive circuit section 130 are arranged on the lower substrate 100. The drive circuit section 130 is located peripherally relative to the pixel array section 120. The pixel array section 120 includes pixel electrodes 111 and thin film transistors (TFT-PXL) for switching/driving the pixel electrodes 111. The thin film transistors TFT-PXL have a dual gate type bottom gate structure and are N-channel type transistors. On the other hand, the drive circuit section 130 includes thin film transistors (TFT-CKT) for driving the thin film transistors TFT-PXL. In the instance of FIG. 1, they are of the single gate type and have a bottom gate structure. Note that only an N-channel type thin film transistor TFT-CKT is shown in FIG. 1. Both the thin film transistors TFT-PXL and thin film transistors TFT-CKT have a multilayer structure realized by sequentially laying a gate electrode 101, gate insulating films 102, 103 and a semiconductor thin film 105. The semiconductor thin film 105 is typically made of polycrystalline silicon. The gate insulating films are a gate nitride film 102 and a gate oxide film 103.

The semiconductor thin film 105 is patterned to produce islands that correspond to the element regions of the thin film transistors. The patterned semiconductor thin film 105 has channel regions ch located inside the ends of the respective gate electrodes 101, low concentration impurity regions (LDD regions) extending outward from the respective channel regions ch and high concentration impurity regions (source regions S and drain regions D) extending outward from the respective low concentration impurity regions (LDD regions). The channel region ch of each thin film transistor is protected by a stopper film 106. The thin film transistors TFT-PXL, TFT-CKT are covered by an interlayer insulating film 107 and a protection film 108. Wiring electrodes 109 are formed on the protection film 108. Each wiring electrode 109 is electrically connected to the source region S or the drain region D of the corresponding thin film transistor by way of a contact hole formed through the interlayer insulating film 107 and the protection film 108. The wiring electrodes 109 are covered by a planarizing film 110. Pixel electrodes 111 are formed on the planarizing film 110 by patterning.

As described above, the substrate 100 carrying a pixel array section and a drive circuit section and an opposite substrate 135 carrying a colour filter 133 and an opposite electrode 131 are disposed vis-a-vis with an electrooptic substance 130 interposed between them in the colour display device of FIG. 1. The pixels that control transmitted light form an organic planarizing film 110 as passivation layer on the gate insulating film and the interlayer insulating film that are components of the thin film transistors and the pixel electrodes 111 typically made of transparent electrically conductive film such as ITO film are formed on the planarizing film. On the other hand, a colour filter 133 of the three primary colours of red, blue and green and a black matrix 134 are formed on the opposite substrate 135 side and a planarizing layer 132 operating as overcoat layer and an opposite electrode 131 are formed on the colour filter 133 and the black matrix 134. The liquid crystal layer sandwiched by the substrates 100, 135 have a substantially same thickness and having the highest transmission factor in a specific wavelength zone that is defined as a function of the film thickness and the refractive index of the liquid crystal layer. In the case of the simple structure as illustrated in FIG. 1, the specific wavelength zone is normally so defined as to make it agree with that of green colour in order to maximize the transmission factor of the panel but with that of blue colour when the colour temperature is emphasized at the time of displaying white. Improvement in terms of transmission factor and colour temperature has been required recently and it is necessary to make the liquid crystal layer have an optimal film thickness for all the wavelengths of red, green and blue in order to meet the requirement. However, with the structure of FIG. 1, it is difficult to change the film thickness of the liquid crystal layer for each pixel without remarkably increasing the number of processing steps.

Figure 2:
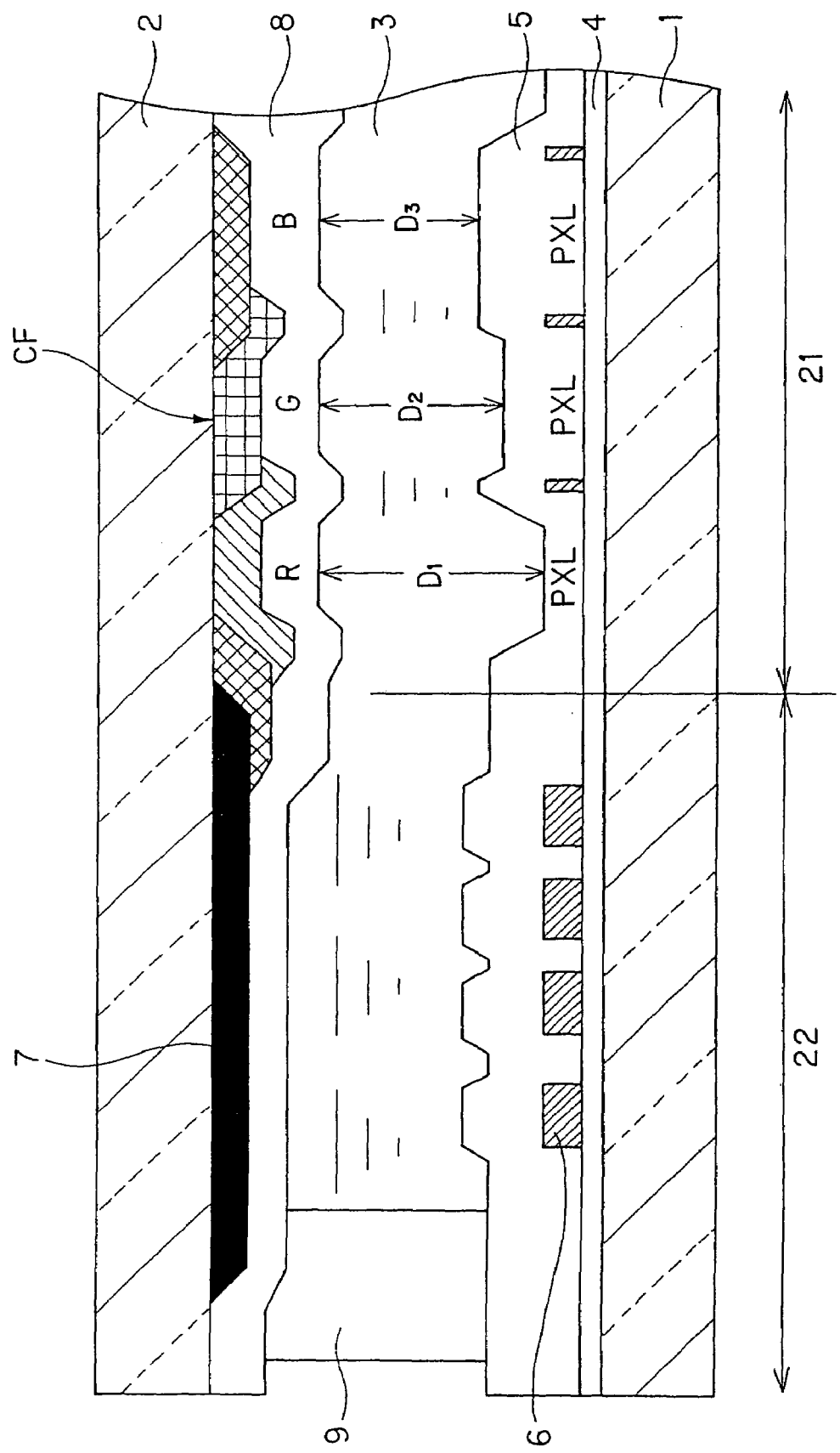
FIG. 2 is a schematic cross sectional view of a part of the first embodiment of display device according to the invention.

FIG. 2 is a schematic cross sectional view of a part of the second embodiment according to the invention.

As shown in FIG. 2, this embodiment of display device has a so-called panel structure produced by arranging a pair of substrates 1, 2 with an electrooptic substance such as liquid crystal 3 held between the substrates. The paired upper and lower substrates 1, 2 are bonded to each other by means of a sealing material 9 with the liquid crystal 3 interposed between them. A set of thin film transistors 4 for forming a pixel array section 21 and a drive circuit section 22, a planarizing film 5 covering the thin film transistors 4 and a set of pixel electrodes arranged in the pixel array section 21 on the planarizing film 5 are disposed on one of the substrates, or the substrate 1. Note that the pixel electrodes are not shown in FIG. 1. Wires 6 are arranged on the set of thin film transistors 4 and the above described planarizing film 5 is formed so as to cover the wires 6.

The above described set of thin film transistors 4 is divided into the pixel array section 21 integrally comprising a plurality of pixels PXL and the peripheral drive circuit section 22. On the other hand, the upper substrate 2 carries the opposite electrode that is arranged vis-a-vis the set of pixel electrodes. Note that the opposite electrode is not shown in FIG. 2. The planarizing film 5 is made of a photosensitive material and shaped by way of an exposure processing operation so as to have a thickness that varies depending on the spot in the first substrate 1.

A colour filter CF and a black matrix 7 are formed on the substrate 2 in addition to the opposite electrode and covered by a protection film 8. Actually, the opposite electrode is formed on the protection film 8. Different display colours of red (R), green (G) and blue (B) are assigned to the pixels PXL by means of the colour filter CF. The planarizing film 5 is shaped in such a way that the thickness of its part corresponding to the pixels PXL varies as a function of the wavelength of the display colour assigned to each pixel.

Thus, the embodiment of FIG. 2 is so designed that the liquid crystal layer 3 have a film thickness that maximizes its transmission factor for light of the wavelength zone of the display colour assigned to each pixel PXL by processing the photosensitive organic planarizing film 5. ECB liquid crystal that is typically used for the VA mode is adopted for the liquid crystal layer 3. For example, the film thickness of the liquid crystal layer 3 is made to vary so that it has a thickness D1 or 3.7 m for the parts of the red pixels, a thickness D2 of 3.5 m for the parts of the green pixels and a thickness D3 of 2.8 m for the parts of the blue pixels.

Photolithography and etching may be used in combination with a material for the planarizing film so that the planarizing film may have a film thickness that varies depending on the spot on the film. Generally, when manufacturing a display device having a so-called panel structure produced by arranging a pair of substrates with an electrooptic substance such as liquid crystal held between the substrates, a set of thin film transistors, a planarizing film covering the transistors and a set of pixel electrodes to be arranged on the planarizing film are formed on one of the substrates, or the first substrate, while an opposite electrode is formed vis-a-vis the set of pixel electrodes on the other substrate, or the second substrate. As described above, the process of forming the planarizing film includes an application step of applying a photosensitive material onto the first substrate, an exposure step of subjecting the planarizing film to an exposure process using a varied planar distribution of quantity of exposure light and a processing step of processing the planarizing film so as to make it have a thickness varied according to the planar distribution of quantity of exposure light. Preferably, light is irradiated onto the planarizing film by way of a mask having a varied planar distribution of transmission factor in the exposure step. The planarizing film is exposed to light for a plurality of times in the exposure step, using a plurality of masks, in order to irradiate light to the planarizing film with a predetermined quantity of energy. Alternatively, a single mask provided with a filter having predetermined parts adapted to irradiate light to the planarizing film with different respective quantities of energy may be used. A pattern adapted to diffract light (and hence not adapted to resolve an image) may be used for the filters in the exposure step. Alternatively, a filter made of two or more than two light shielding substances (half tone substances) having different light transmission factors may be used. Preferably, a mask provided with a half tone filter having a light transmission factor between 1% and 50% is used in the exposure step.

Figure 3:
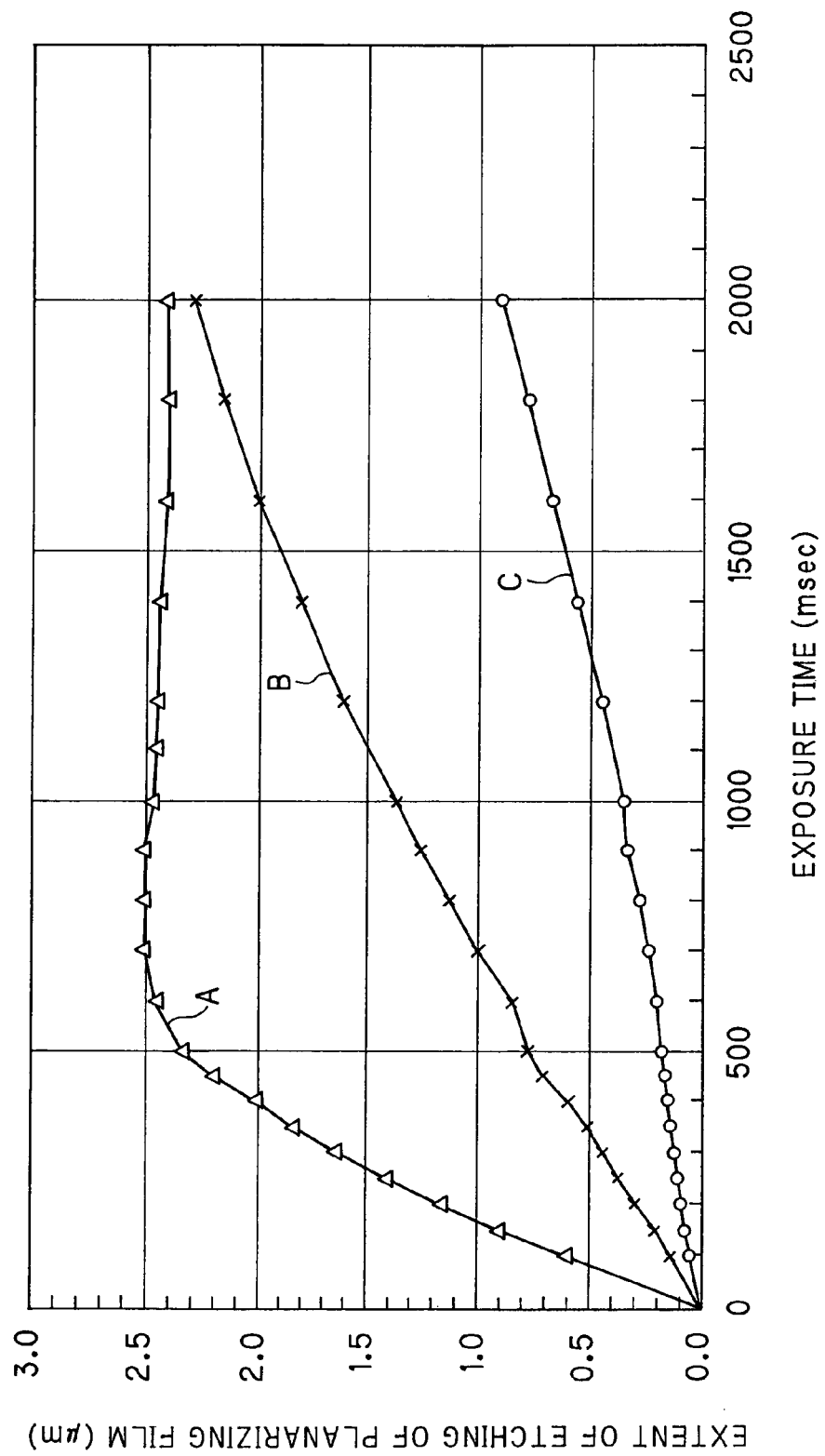
FIG. 3 is a graph illustrating the relationship between the exposure time and the extent of etching the planarizing film of a display device according to the invention.

Particularly, when the planarizing film is made to have a film thickness that varies from pixel to pixel, preferably the planarizing film is exposed to light to a half extent for each pixel and then the film thickness is reduced further by an etching operation that is conducted as a function of the extent of exposure for each pixel in order to control the film thickness of the planarizing film. FIG. 3 shows the relationship between the extent of exposure and that of etching of the planarizing film when such a technique is used.

Referring to FIG. 3, the horizontal axis of the graph indicates the extent of exposure to light expressed in terms of the duration of exposure (msec) and the vertical axis of the graph indicates the extent of etching (m) of the planarizing film. The extent of exposure of the planarizing film to light is controlled by using a mask that utilizes a diffraction pattern. The film thickness of the planarizing film can be controlled by exposing it to light, using a mask, and subsequently subjecting it to a development process. The graph of FIG. 3 shows the relationship between the extent of exposure and that of etching of the planarizing film for three different masks. Referring to FIG. 3, the curve A shows the data obtained when a fully open mask is used. It will be seen from the curve A that the extent of etching (the reduction of the film thickness of the planarizing film) increases as the exposure time increases, although the extent of etching becomes saturated when the exposure time exceeds 500 msec. On the other hand, the curve B shows the data obtained when a mask of a striped pattern having light zones and dark zones arranged alternately, both the light zones and the dark zones having a width of 0.25 m, is used. It will be seen from the curve B that the extent of etching can be controlled substantially as a linear function of the exposure time. Finally, the curve C shows the data obtained when a mask of a striped pattern having light zones with a width of 0.25 m and dark zones with a width of 0.75 m, said light zones arranged alternately. Thus, the mask of the curve C blocks more light than that of the curve B. Therefore, in the case of the curve C, while the extent of etching increases linearly proportionally relative to the exposure time, the rate at which the extent of etching increases is lower than that of the curve B. The above described technique of using a diffraction pattern for controlling the extent of exposure may be replaced by the use of a half tone material that corresponds to a predetermined transmission factor. If such is the case, a mask is prepared by using a layer of a material whose transmission factor is known relative to a predetermined wavelength of light to be used for exposure, MoSi for instance, and whose film thickness is so controlled as to regulate the quantity of transmitted light. For example, the film thickness can be so controlled as to have four different values (including one for totally transmitting light) by using a three-layered mask formed from two different half tone materials, one having a transmission factor of 25% for red pixels and one having a transmission factor of 20% or so for green pixels, and a material that completely block light for blue pixels.

Figure 4:
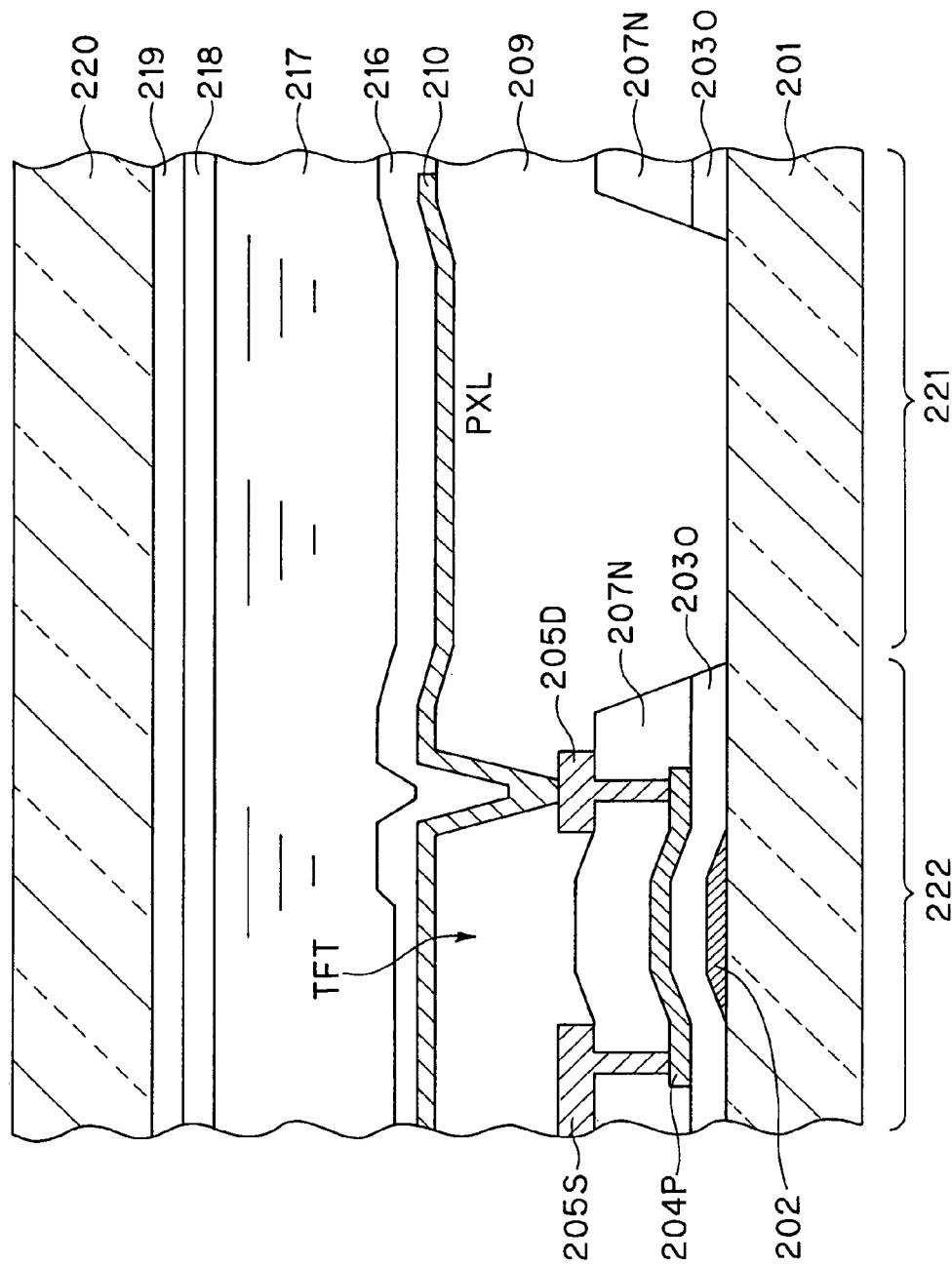
FIG. 4 is a cross sectional view of a part of a display device shown for reference.

Now, the technology that provides the background of the present invention will be briefly described by referring to FIG. 4 before describing the second embodiment of the invention.

FIG. 4 is a cross sectional view of a part of an active matrix type display device shown for reference. It illustrates only a pixel of the device. The display device has pixels arranged in the form of a matrix on a transparent substrate 201 typically made of glass. Each pixel is divided in an open region 221 and a non-open region 222. A pixel PXL is formed in the open region 221 and adapted to emit light through the substrate 201. More specifically, the pixel PXL is made of liquid crystal 217 and held between a pair of transparent electrodes 210, 219 that are arranged vis-a-vis relative to each other. It is also referred to a liquid crystal cell. Note that, one of the electrodes, or the first electrode 210, is formed at the side of the glass substrate 201, while the other electrode, or the second electrode 219, is formed on an opposite substrate 220. It is also referred to as opposite electrode. The liquid crystal cell operates as a light bulb that receives light from a back light (not shown) arranged at the rear surface side of the glass substrate 201 and emits light to the front surface side of the glass substrate 201. The surface of the pixel electrode 210 is covered by an orientation film 216, while the surface of the opposite electrode 219 is covered by a different orientation film 218.

On the other hand, a thin film transistor TFT for driving the above described liquid crystal cell is formed in the non-open region 222. As shown in FIG. 4, the thin film transistor has a bottom gate structure and a polycrystalline semiconductor thin film 204P typically made of polysilicon is formed on the metal-made gate electrode 202 with a gate insulating film 203O interposed between them. The polycrystalline semiconductor thin film 204P is covered by an interlayer insulating film 207N typically made of silicon nitride and a source electrode 205S and a drain electrode 205D are formed on it. The electrodes 205S, 205D are covered by a planarizing film 209 that is made of organic transparent resin film. The planarizing film 209 planarizes the surface of the glass substrate 201 and, at the same time, operates as protect film for the thin film transistor TFT. The above described pixel electrode 210 is formed in the planarizing film 209 and electrically connected to the thin film transistor TFT by way of the drain electrode 205D. The gate insulating film 203O, the interlayer insulating film 207N and the planarizing film 209 that are described above are laid one on the other to produce a first film structure. The first film structure contains the thin film transistor TFT in the non-open region 222. In other words, the first film structure is formed to contain the thin film transistor from the upper and lower sides. On the other hand, a second film structure extends from the first film structure and arranged in the open-region 221 that is located adjacently relative to the non-open region 222. In the instance of FIG. 4, the second film structure comprises only the planarizing film 209 which is located between the liquid crystal cell formed on the pixel electrode 210 and the glass substrate 201.

In the instance of FIG. 4, all the unnecessary film is removed from the open region 221 and only the planarizing film 209 of organic resin is directly formed on the glass substrate 201. If the planarizing film 209 is made of acrylic resin, its refractive index is 1.4 to 1.6 and does not practically differ from that of the glass substrate 201 at all. Therefore, no unnecessary reflection occurs along the interface due to difference of refractive index. Thus, by removing layers having different refractive indexes from the open region 221 as much as possible, the multilayer interference is reduced to improve the transmission factor of the panel. Then, because of elimination of interference effect, variances among the products can be minimized. Additionally, reflection of the panel can also be minimized. Furthermore, since the non-open region 222 and the open region 221 can be treated in a common process, the manufacturing process does not require any additional steps if compared with conventional manufacturing methods.

Figure 5:
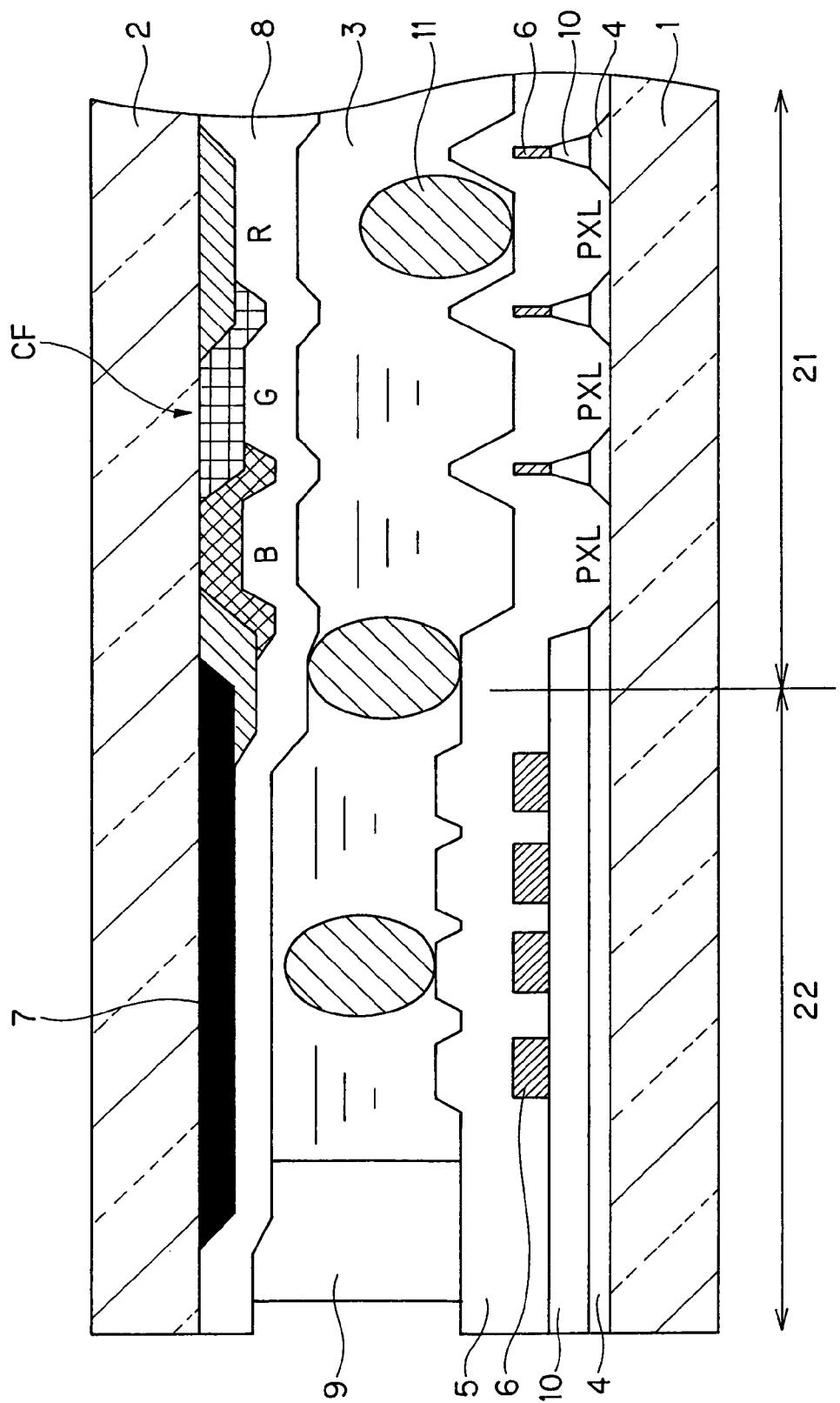
FIG. 5 is a cross sectional view of a part of a display device also shown for reference.

FIG. 5 is a cross sectional view of a part of a display device of FIG. 4 also shown for reference. The drive circuit section 22 is shown in FIG. 5 in addition to the pixel array section. In order to facilitate understanding, the parts corresponding to those of the first embodiment of the present invention illustrated in FIG. 2 are denoted respectively by the same reference symbols. As shown in FIG. 5, the display device is divided into a pixel array section 21 where pixels PXL are integrally formed and a peripheral drive circuit section 22. It will be appreciated that FIG. 4 shows a pixel PXL formed in the pixel array section 21 in enlarged dimensions.

Both the drive circuit section 22 and the pixel array section 21 are formed on an insulating substrate 1 and include a set of thin film transistors 4. As seen from FIG. 5, the set of thin film transistors 4 is covered by an interlayer insulating film 10 and wires 6 are formed on the surface of the latter by means of a patterning operation. The wires 6 are covered by a planarizing film 5 that extends to both the drive circuit section and the pixel array section. A colour filter CF and a black matrix 7 are formed on the inner surface of the upper substrate 2. The upper and lower substrates 1, 2 are bonded to each other by means of a sealing material 9 with a liquid crystal layer 3 interposed between them. Gap spacers 11 are arranged in the gap separating the substrates 1, 2.

As described above by referring to FIG. 4, reflection due to interference is reduced to improve the transmission factor and the colour temperature of the open region 221 of each pixel PXL of the pixel array section 21 by removing the films having different refractive indexes therefrom except the planarizing film 5. However, it is difficult for the planarizing film 5 to completely eliminate the steps produced by the gate insulating film and the interlayer insulating film 10, which may be of the size of about 0.6 m. In other words, the surface of the planarizing film 5 may have a remarkable step between the drive circuit section 22 and the pixel array section 21. Therefore, a problem of uneven gap can occur in a peripheral part of the panel particularly when the gap spacers 11 distributed in the pixel array section 21 ride on the planarizing film 5 in the drive circuit section.

Figure 6:
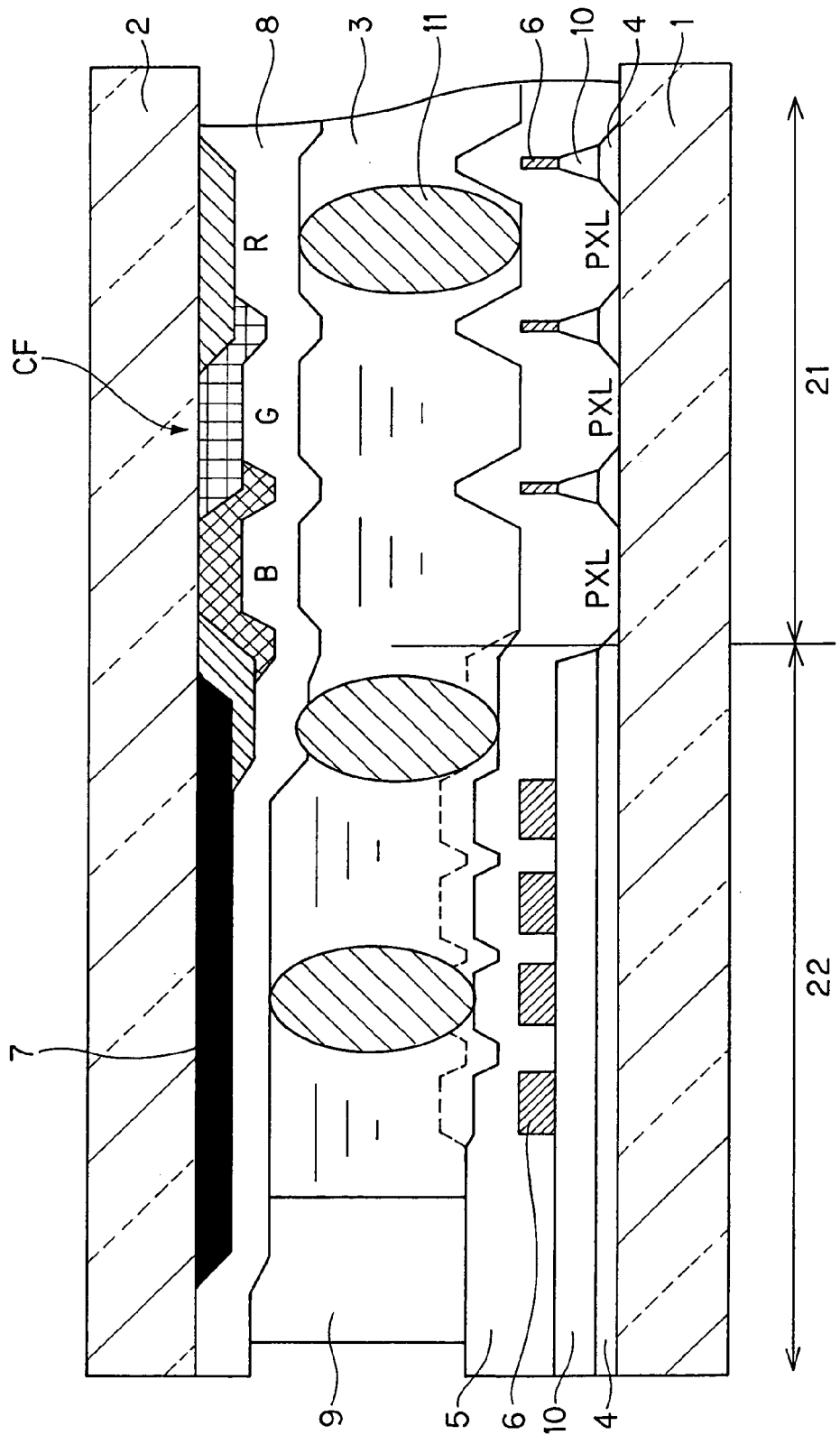
FIG. 6 is a schematic cross sectional view of a part of the second embodiment of display device according to the invention.

FIG. 6 is a schematic cross sectional view of a part of the second embodiment of display device according to the invention, which dissolves the problem of the device illustrated in FIG. 5 for reference. In order to facilitate understanding, the parts corresponding to those of the device illustrated in FIG. 5 are denoted respectively by the same reference symbols. As clearly shown in FIG. 6, the surface of the planarizing film 5 is lowered to make the film 5 have a film thickness reduced to a certain extent in the drive circuit section 22 if compared with the pixel array section in order to avoid an uneven gap in the peripheral area of the panel. More specifically, the thickness of the planarizing film 5 is reduced by etching it from the surface thereof in the peripheral drive circuit section 22, taking the thickness of the interlayer insulating film 10 into consideration, so that the planarizing film 5 may have a uniform surface over the entire area of the substrate 1. If, for instance, the planarizing film 5 is formed by applying photosensitive organic resin to the surface of the substrate 1 and subsequently subjecting it to a local exposure process by using a mask having a transmission factor of 25% so that the planarizing film 5 may be removed by etching from the surface thereof only in the drive circuit section.

Now, the technology that provides the background of the present invention will be briefly described again by referring to FIG. 7 before describing the third embodiment of the invention.

Figure 7:
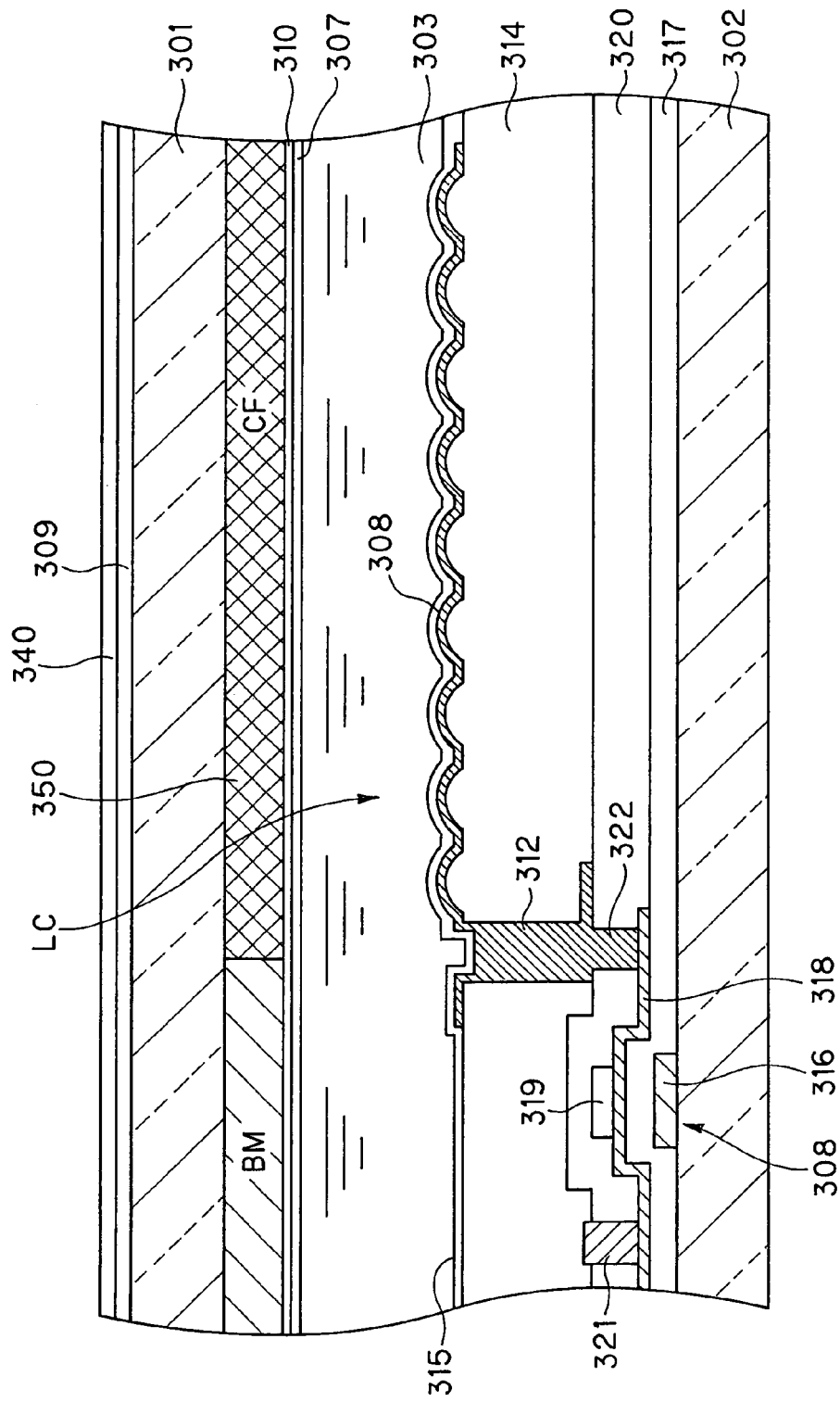
FIG. 7 is a cross sectional view of a part of display device also shown for reference.

FIG. 7 is a cross sectional view of a part of display device also shown for reference and comprising a pair of substrates 301, 302, or a front substrate and a rear substrate, bonded to each other with a predetermined gap separating them and a layer of an electrooptic substance such as a liquid crystal layer 303 held in the gap. Pixels are arranged in the form of a matrix in the device and adapted to reflect light striking it from the front surface side back to the front surface side. The reflecting region of the device comprises electrodes 310, 322 formed respectively on the pair of substrates 301, 302, the liquid crystal layer 303 sandwiched between the electrodes 310, 322 and a reflection layer 308 formed on the rear substrate 302 and provides a so-called reflection type liquid crystal display element LC.

A planarizing layer 340 and a quarter-wave plate 309 are formed on the outer surface of the substrate 301. A colour filter CF formed by a coloured layer 350 is arranged on the inner surface of the substrate 301. A black matrix BM is formed also on the inner surface of the substrate 301 so as to divide the colour filter CF into small units that correspond to so many pixels.

An opposite electrode 310 is formed on the surface of the colour filter CF and that of the black matrix BM to commonly correspond to the pixels. An orientation film 307 is formed on the opposite electrode 310. The liquid crystal layer 303 is arranged on the orientation film 307 and adapted to have a composite refractive property. The rear substrate 302 is arranged below the liquid crystal layer 303. The surface of the substrate 302 is covered by an orientation film 315, which cooperates with the orientation film 307 of the front substrate 301 to orient the liquid crystal layer 303 typically in a horizontal direction. The reflection layer 308 is arranged under the orientation film 315 and designed to operate as pixel electrodes. The reflection layer 308 is made of metal film formed on the undulated surface of the planarizing film 314 and designed to operate as pixel electrodes. Thin film transistors 308 are formed below the planarizing film 314. The thin film transistors 308 have a bottom gate structure, which is a multilayer structure realized by sequentially laying a gate electrode 316, a gate insulating film 317 and a semiconductor thin film 318. The semiconductor thin film 318 is typically made of polycrystalline silicon and protected from above by a stopper 319 in a channel region that matches the gate electrode 316. Each of the thin film transistors 308 having such a bottom gate structure is covered by an interlayer insulating film 320. The interlayer insulating film 320 has a pair of contact holes and a source electrode 321 and a drain electrode 322 are electrically connected to the thin film transistor 308 by way of the respective contact holes. The electrodes 321 and 322 are typically formed by patterning an aluminum film. The drain electrode 322 is connected to the above described reflection layer 308. Thus, the reflection layer 308 is electrically connected to the drain electrode 322 by way of the contact hole 312 formed in the planarizing film 314. On the other hand, a signal voltage is applied to the source electrode 321.

Figure 8:
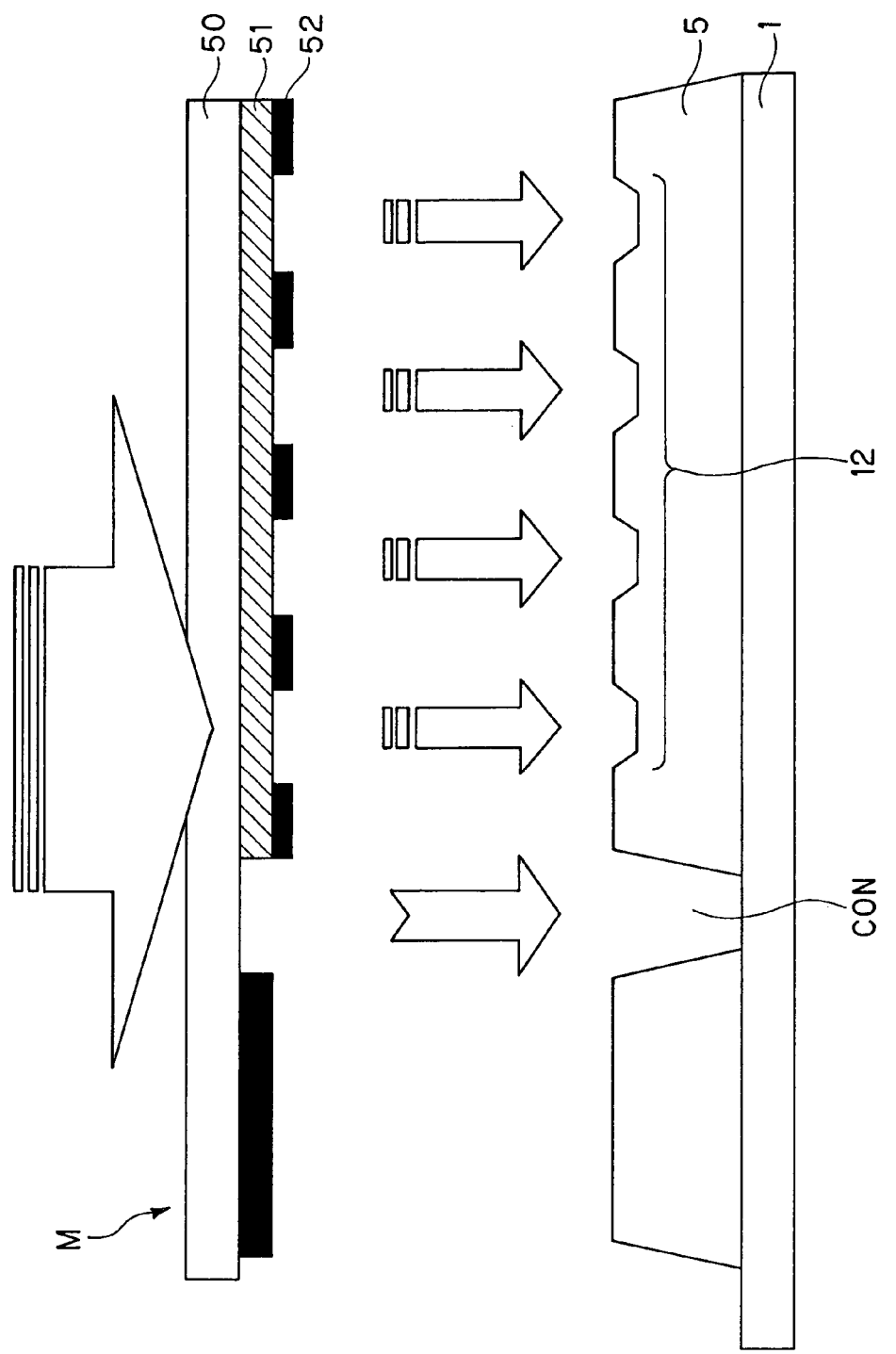
FIG. 8 is a schematic cross sectional view of a part of the third embodiment of display device according to the invention.

With the above described reflection type display device, undulations are randomly formed on the planarizing film 314 that is produced by applying organic resin onto the substrate 302 in order to improve the visibility of reflected light. However, known manufacturing methods for manufacturing such a display device are accompanied by a problem of productivity because two organic planarizing film layers need to be subjected to an exposure process in order to randomly form undulations. The third embodiment of the present invention is designed to avoid this problem by using a structure as shown in FIG. 8. The present invention also provides a method of manufacturing a display device having such a structure.

In order to facilitate understanding, only the lower substrate 1 of the display device is shown in FIG. 8. A planarizing film 5 is formed on the substrate 1. Undulations 12 for reflection film and a contact hole CON are formed in the planarizing film 5. Photolithography and etching are used along with a mask M for forming the undulations 12 and the contact hole CON. In other words, the photosensitive planarizing film 5 is subjected to an exposure process by using the mask M in order to locally control the film thickness of the planarizing film 5. More specifically, the parts of the mask corresponding to the contact holes CON where the organic planarizing film 5 is completely removed are made to have a transmission factor of 100% and the parts for forming undulations 12 are formed by using a half tone material 51 having a transmission factor of 20% and a completely light shielding material 52. In other words, a film layer of the half tone material 51 and that of the completely light shielding material 52 are formed on the base material 50 of the mask M. With this arrangement, it is possible to produce undulations 12 and contact holes 51 simultaneously. An aligner adapted to use rays of light having a long wavelength such as g rays or h rays is preferably used for the purpose of the invention. Mild undulations can easily be produced by de-focussing light in the exposure process. More mild undulations can be produced by heating the organic planarizing film 5 for a re-flow process. With the above described method, the process of producing undulations 12 that normally requires a number of processing steps is greatly simplified so that a display device according to the invention can be manufactured at reduced cost.

While typical bottom gate type transistors are used in the above description, the present invention is by no means limited thereto and the present invention can be applied equally to the use of other top gate type transistors, a-Si transistors and simple matrix type liquid crystal.

Figure 9:
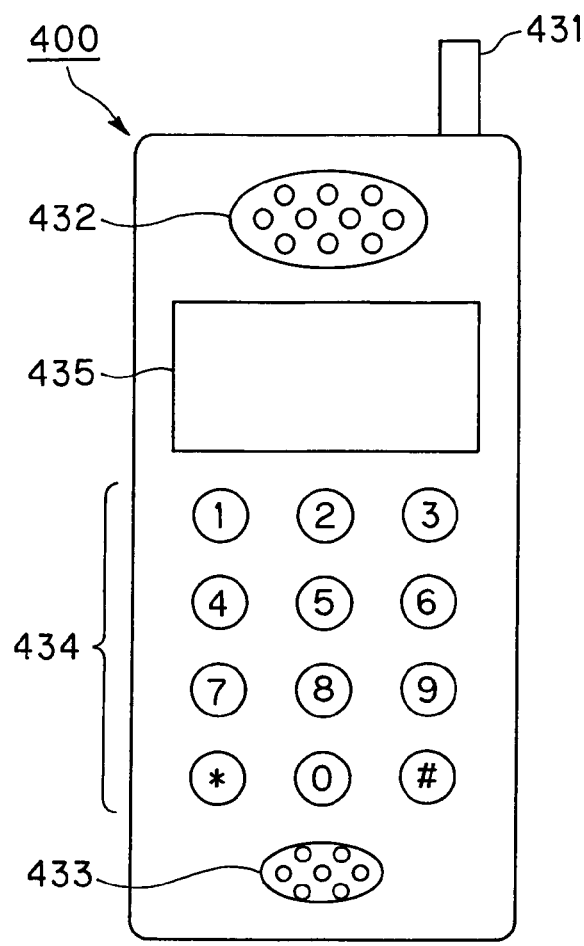
FIG. 9 is a schematic plan view of a cellular phone terminal device realized by applying the present invention.

FIG. 9 is a schematic plan view of a cellular phone terminal device realized by applying the present invention.

As shown in FIG. 9, the cellular phone terminal device 400 has a compact structure realized by forming as integral parts thereof an operating section that is used for making a call and receiving a call, a talking section that is used for a telephone conversation after making a call or receiving a call and a display section that can display information relating at least to the operation for the call. More specifically, the cellular phone terminal device 400 comprises an antenna 431 for radio transmission/reception, a receiver 432 and a transmitter 433 along with operation keys 434 including dial keys and a display section 435. The receiver 432 comprises a loudspeaker and the transmitter 433 comprises a microphone.

The display section 435 of the cellular phone terminal device 400 comprises a display device according to the invention. The cellular phone terminal device 400 can display telephone direction information including personal names and telephone numbers on the display section 435. If desired, it may be so designed that it can display the received e-mails on the display section 435.

Figure 10:
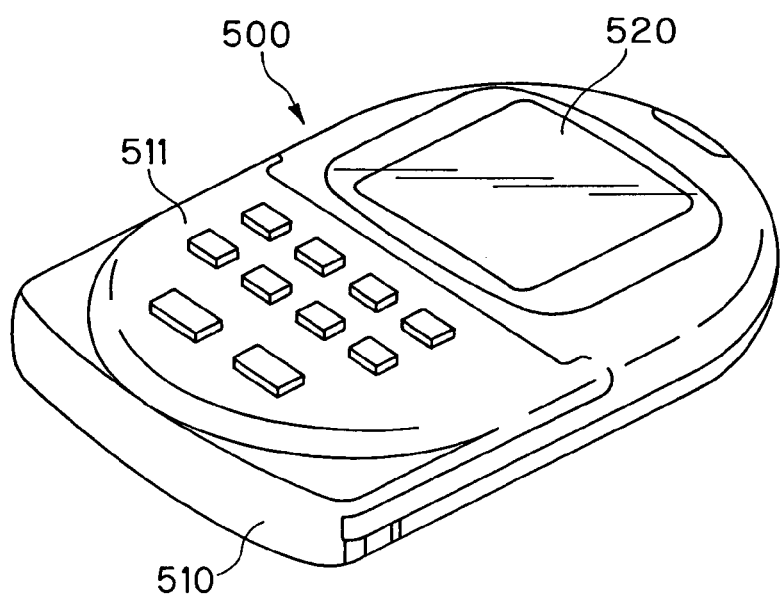
FIG. 10 is a schematic perspective views of a portable information terminal device realized by applying the present invention.

FIG. 10 is a schematic perspective views of a portable information terminal device realized by applying the present invention.

Referring to FIG. 10, the portable information terminal device (PDA) 500 has a compact structure realized by forming as integral parts thereof an operating section 511 that is used for inputting instructions, a processing section 510 that is used for processing information according to instructions and a display section S20 that can display processed information. The processing section 510 comprises a communication section, a sound processing section, a control section and a memory section that are necessary for performing basic functions of a PDA. The control section that typically comprises a CPU controls these functions to allow the information terminal device to operate as telephone set or as personal computer for sending/receiving e-mails, communicating with other personal computers and/or controlling personal information. Any of the above functions can be selected by operating the operating section 511. The processing section 510 generates image information according to the processing operation it performs. The display section 520 displays the image information generated by the information processing section 510.

The display section 520 may be a colour display device, a reflection type display device or a display device having a built-in drive circuit realized by applying the present invention.

INDUSTRIAL APPLICABILITY

Thus, according to the invention, it is now possible to form a photosensitive organic planarizing film having a varied film thickness on a same substrate by preparing a pattern for transmitting varied quantity of light in a same mask to be used for exposure to light. Then, a multi-gap panel can be formed for RGB pixels to improve the transmission factor and the colour reproducibility. Additionally, it is possible to improve the uneven gap and hence the quantity of the displayed image by reducing the film thickness of the organic planarizing film on the peripheral drive circuit section. Furthermore, it is now possible to prepare undulations and contact holes of a reflection type display device in a same step to reduce the number of steps and hence the overall manufacturing cost.

The invention claimed is:

1. A display device, comprising:
    a panel structure having a first substrate and a second substrate bonded to each other with a predetermined gap separating them and an electrooptic substance held in the gap between the first substrate and the second substrate;
    a set of thin film transistors, a planarizing film covering said thin film transistors, and a set of pixel electrodes arranged on the planarizing film being formed on the first substrate;
    an opposite electrode being formed vis-a-vis the set of pixel electrodes on the second substrate; and
    the planarizing film of the display device being made of a photosensitive material and formed to have a varying thickness in the first substrate by means of an exposure process,
    wherein said first substrate has thereon a pixel array section formed by the pixel electrodes and thin film transistors for driving the pixel electrodes and a drive circuit section formed by thin film transistors for driving the pixel array section, and
    said planarizing film is formed so as to extend from the pixel array section to the peripheral drive circuit section and to have a thickness differentiated between the pixel array section and the drive circuit section.

2. A display device comprising:
    a panel structure having a first substrate and a second substrate bonded to each other with a predetermined gap separating them and an electooptic substance held in the gap between the first substrate and the second substrate;
    a set of thin film transistors, a planarizing film covering said thin film transistors and a set of pixel electrodes arranged on the planarizing film being formed on the first substrate;
    an opposite electrode being formed vis-a-vis the set of pixel electrodes on the second substrate; and
    the planarizing film of the display device being made of a photosensitive material and formed to have a varying thickness in the first substrate by means of an exposure process,
    wherein different display colors are assigned to the pixel electrodes and the planarizing film is formed to have a thickness that varies according to the wavelength of the display color assigned to each of the pixel electrodes.

3. A method of manufacturing a display device having a panel structure having a first substrate and a second substrate bonded to each other with a predetermined gap separating them and an electrooptic substance held in the gap between the first substrate and the second substrate, said method including:
    a step of forming a set of thin film transistors, a planarizing film covering said thin film transistors and a set of pixel electrodes arranged on the planarizing film on the first substrate, and forming an opposite electrode vis-a-vis the set of pixel electrodes on the second substrate;
    said step of forming said planarizing film including:
    an application step of applying a photosensitive material onto the first substrate;
    an exposure step of subjecting the planarizing film to an exposure process using a varied planar distribution of quantity of exposure light; and a processing step of processing the planarizing film so as to make it have a thickness varied according to the planar distribution of quantity of exposure light, by etching the surface of the exposed planarizing film, wherein the planarizing film is exposed to light for a plurality of times in the exposure step, using a plurality of masks, in order to irradiate light to the planarizing film with a predetermined quantity of energy.

4. A method of manufacturing a display device having a panel structure having a first substrate and a second substrate bonded to each other with a predetermined gap separating them and an electrooptic substance held in the gap between the first substrate and the second substrate, said method including:

a step of forming a set of thin film transistors, a planarizing film covering said thin film transistors and a set of pixel electrodes arranged on the planarizing film on the first substrate, and forming an opposite electrode vis-a-vis the set of pixel electrodes on the second substrate;

said step of forming said planarizing film including:

an application step of applying a photosensitive material onto the first substrate;

an exposure step of subjecting the planarizing film to an exposure process using a varied planar distribution of quantity of exposure light; and a processing step of processing the planarizing film so as to make it have a thickness varied according to the planar distribution of quantity of exposure light, by etching the surface of the exposed planarizing film, wherein light is irradiated onto the planarizing film by way of a mask having a varied planar distribution of transmission factor in the exposure step, wherein a single mask provided with a filter having predetermined parts adapted to irradiate light to the planarizing film with different respective quantities of energy is used in said exposure step, and wherein a filter made of two or more than two light shielding substances having different light transmission factors is used in the exposure step.

5. A method of manufacturing a display device having a panel structure having a first substrate and a second substrate bonded to each other with a predetermined gap separating them and an electooptic substance held in the gap between the first substrate and the second substrate, said method including:

a step forming a set of thin film transistors, a planarizing film covering said thin film transistors and a set of pixel electrodes arranged on the plaraizing film on the first substrate, and forming an opposite electrode vis-a-vis the set of pixel electrodes on the second substrate;

said step of forming said planarizing film including;

an application step of applying a photosensitive material onto the first substrate;

an exposure step of subjecting the planarizing film to an exposure process using a varied planar distribution of quantity of exposure light; and a processing step of processing the planarizing film so as to make it have a thickness varied according to the planar distribution of quantity of exposure light, by etching the surface of the exposed planarizing film, wherein light is irradiated onto the planarizing film by way of a mask having a varied planar distribution of transmission factor in the exposure step, wherein a single mask provided with a filter having predetermined parts adapted to irradiate light to the planarizing film with different respective quantities of energy is used in said exposure step, and wherein a mask provided with a filter having a light transmission factor between 1% and 50% is used in the exposure step.

6. A method of manufacturing a display device having a panel structure having a first substrate and a second substrate bonded to each other with a predetermined gap separating them and an electrooptic substance held in the gap between the first substrate and the second substrate, said method including:

a step forming a set of thin film transistors, a planarizing film covering said thin film transistors and a set of pixel electrodes arranged on the planarizing film on the first substrate, and forming an opposite electrode vis-a-vis set of pixel electrodes on the second substrate;

said step of forming said planarizing film including:

an application step of applying a photosensitive material onto the first substrate;

an exposure step of subjecting the planarizing film to an exposure process using a varied planar distribution of quantity of exposure light; and a processing step of processing the planarizing film so as to make it have a thickness varied according to the planar distribution of quantity of exposure light, by etching the surface of the exposed planarizing film, wherein a pixel array section comprising pixel electrodes and thin film transistors for driving the pixel electrodes and a drive circuit section comprising thin film transistors for driving the pixel array section are formed on one of said substrates; and said planarizing film is formed to extend from the pixel array section to the peripheral drive circuit section and have a film thickness differentiated between the pixel array section and the drive circuit section.

7. A method of manufacturing a display device having a panel structure having a first substrate and a second substrate bonded to each other with a predetermined gap separating them and an electrooptic substance held in the gap between the first substrate and the second substrate, said method including:

a step of forming a set of thin film transistors, a planarizing film covering said thin film transistors and a set of pixel electrodes arranged on the planarizing film on the first substrate, and forming an opposite electrode vis-a-vis the set of pixel electrodes on the second substrate;

said step of forming said planarizing film including:

an application step of applying a photosensitive material onto the first substrate;

an exposure step of subjecting the planarizing film to an exposure process using a varied planar distribution of quanity of exposure light; and a processing step of processing the planarizing film so as to make it have a thickness varied according to the planar distribution of quantity of exposure light, by etching the surface of the exposed planarizing film, wherein different display colors are assigned to the pixel electrodes and the thickness of the parts of said planarizing film corresponding to the pixel electrodes are made to vary according to the wavelengths of the display colors assigned to the respective pixel electrodes.

8. A cellular phone terminal device comprising an operating section for operations relating to making a call and receiving a call, a talking section allowing telephone conversation to take place after making a call or receiving a call, and a display section for displaying information relating at least to the operation for the call;

said display section having a panel structure having a first substrate and a second substrate bonded to each other with a predetermined gap separating them and an electro optic substance held in the gap between the first substrate and the second substrate;

a set of thin film transistors, a planarizing film covering said thin film transistors and a set of pixel electrodes arranged on the planarizing film being formed on the first substrate;

an opposite electrode being formed vis-a-vis the set of pixel electrodes on the second substrate; and the planarizing film of the display device being made of a photosensitive material and formed to have a varying thickness in the first substrate by means of an exposure process, wherein said first substrate has thereon a pixel array section formed by the pixel electrodes and thin film transistors for driving the pixel electrodes and a drive circuit section formed by thin film transistors for driving the pixel array section, and said planarizing film is formed so as to extend from the pixel array section to the peripheral drive circuit section and have a thickness differentiated between the pixel array section and the drive circuit section.

9. A cellular phone terminal device comprising an operating section for operations relating to making a call and receiving a call, a talking section for allowing telephone conversation to take place after making a call or receiving a call, and a display section for displaying information relating at least to the operation for the call;

said display section having a panel structure having a first substrate and a second substrate bonded to each other with a predetermined gap separating them and an electro optic substance held in the gap between the first substrate and the second substrate;

a set of thin film transistors, a planarizing film covering said thin film transistors and a set of pixel electrodes arranged on the planarizing film being formed on the first substrate;

an opposite electrode being formed vis-a-vis the set of pixel electrodes on the second substrate; and the planarizing film of the display device being made of a photosensitive material and formed to have a varying thickness in the first substrate by means of an exposure process, wherein different display colors are assigned to the pixel electrodes and the planarizing film is formed to have a thickness that varies according to the wavelength of the display color assigned to each of the pixel electrodes.

10. A portable information terminal device comprising an operating section for inputting instructions, a processing section for processing information according to instructions, and a display section for displaying processed information;

said display section having a panel structure having a first substrate and a second substrate bonded to each other with a predetermined gap separating them and an electrooptic substance held in the gap between the first substrate and the second substrate;

a set of thin film transistors, a planarizing film covering said thin film transistors and a set of pixel electrodes arranged on the planarizing film being formed on the first substrate;

an opposite electrode being formed vis-a-vis the set of pixel electrodes on the second substrate; and the planarizing film of the display device being made of a photosensitive material and formed to have a varying thickness in the first substrate by means of an exposure process, wherein said first substrate has thereon a pixel array section formed by the pixel electrodes and thin film transistors for driving the pixel electrodes and a drive circuit section formed by thin film transistors for driving the pixel array section, and said planarizing film is formed so as to extend from the pixel array section to the peripheral drive circuit section and have a thickness differentiated between the pixel array section and the drive circuit section.

11. A portable information terminal device comprising an operating section for inputting instructions, a processing section for processing information according to instructions, and a display section for displaying processed information;

said display section having a panel structure having a first substrate and a second substrate bonded to each other with a predetermined gap separating them and an electrooptic substance held in the gap between the first substrate and the second substrate;

a set of thin film transistors, a planarizing film covering said thin film transistors and a set of pixel electrodes arranged on the planarizing film being formed on the first substrate;

an opposite electrode being formed vis-a-vis the set of pixel electrodes on the second substrate; and the planarizing film of the display device being made of a photosensitive material and formed to have a varying thickness in the first substrate by means of an exposure process, wherein different display colors are assigned to the pixel electrodes and the planarizing film is formed to have a thickness that varies according to the wavelength of the display color assigned to each of the pixel electrodes.

* * * * *